United States Patent [19]

Davy

[11] Patent Number: 5,649,656

[45] Date of Patent: Jul. 22, 1997

[54] RECEIVER HITCH BOAT AND CANOE RACK

[76] Inventor: Charles E. Davy, P.O. Box 131, Osseo, Wis. 54758

[21] Appl. No.: 443,594

[22] Filed: May 17, 1995

[51] Int. Cl.⁶ ........................................... B60P 3/10
[52] U.S. Cl. .................. 224/405; 224/501; 224/521; 224/531; 224/532; 414/462
[58] Field of Search ............................... 224/402, 403, 224/404, 405, 488, 495, 501, 510, 518, 519, 520, 521, 522, 523, 531, 532, 533, 534, 320, 567, 568, 552, 321, 550, 551; 414/462

[56] References Cited

U.S. PATENT DOCUMENTS

| | | | |
|---|---|---|---|
| 2,634,892 | 4/1953 | Wachowski | 224/551 |
| 2,670,113 | 2/1954 | Ellingson | 414/462 |
| 2,787,476 | 4/1957 | Holsclaw | 224/552 |
| 3,357,578 | 12/1967 | Koenig | 414/462 |
| 3,819,074 | 6/1974 | Oliver | 414/462 |
| 3,885,689 | 5/1975 | Grove et al. | 414/462 |
| 3,976,213 | 8/1976 | Ball | 414/462 |
| 4,630,990 | 12/1986 | Whiting | 224/403 |
| 4,635,835 | 1/1987 | Cole | 224/501 |
| 5,169,042 | 12/1992 | Ching | 224/521 |
| 5,244,133 | 9/1993 | Abbott et al. | 224/521 |
| 5,451,088 | 9/1995 | Broad | 224/405 |
| 5,458,389 | 10/1995 | Young | 224/402 |

*Primary Examiner*—Henry J. Recla
*Assistant Examiner*—Gregory M. Vidovich

[57] ABSTRACT

A receiver hitch boat and canoe rack comprised of a right angle extension adapted for adjustable coupling with a receiver hitch on a vehicle. A hollow vertical post telescopically receives the right angle extension for adjustable securement thereto by a nut and bolt. A hollow horizontal post is integral with the hollow vertical post in an orthogonal relationship. The hollow horizontal post has open end portions. A pair of cross bars are telescopically received within the open end portions of the hollow horizontal post for adjustable securement thereto by a nut and bolt. The pair of cross bars have an eye bolt secured thereto.

1 Claim, 4 Drawing Sheets

RECEIVER HITCH BOAT AND CANOE RACK

BACKGROUND OF THE INVENTION

1. Field of the Invention

The present invention relates to a receiver hitch boat and canoe rack and more particularly pertains to supporting a back end of a boat or canoe that extends over a top portion of a vehicle while being transported with a receiver hitch boat and canoe rack.

2. Description of the Prior Art

The use of mountable racks is known in the prior art. More specifically, mountable racks heretofore devised and utilized for the purpose of mounting on vehicles for transporting of objects are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,228,607 to Tolsdorf discloses a rack mountable on a trailer hitch ball.

U.S. Pat. No. 5,169,042 to Ching discloses a bicycle carrying rack.

U.S. Pat. No. 5,106,002 to Smith et al. discloses a hitch mounted carrying assembly and method.

U.S. Pat. No. 4,938,399 to Hull et al. discloses an article carrier.

U.S. Pat. No. 4,813,584 to Wiley discloses a detachable cargo carrier.

While these devices fulfill their respective, particular objective and requirements, the aforementioned patents do not describe a receiver hitch boat and canoe rack for supporting a back end of a boat or canoe that extends over a top portion of a vehicle while being transported.

In this respect, the receiver hitch boat and canoe rack according to the present invention substantially departs from the conventional concepts and designs of the prior art, and in doing so provides an apparatus primarily developed for the purpose of supporting a back end of a boat or canoe that extends over a top portion of a vehicle while being transported.

Therefore, it can be appreciated that there exists a continuing need for new and improved receiver hitch boat and canoe rack which can be used for supporting a back end of a boat or canoe that extends over a top portion of a vehicle while being transported. In this regard, the present invention substantially fulfills this need.

SUMMARY OF THE INVENTION

In the view of the foregoing disadvantages inherent in the known types of mountable racks now present in the prior art, the present invention provides an improved receiver hitch boat and canoe rack. As such, the general purpose of the present invention, which will be described subsequently in greater detail, is to provide a new and improved receiver hitch boat and canoe rack and method which has all the advantages of the prior art and none of the disadvantages.

To attain this, the present invention essentially comprises a right angle extension having a first securement portion. The first portion has a first end and a second end. The first portion has a plurality of apertures formed therethrough inwardly of the first end thereof. The first end is adapted for adjustable coupling with a receiver hitch on a vehicle. The right angle extension has a second portion. The second portion has a first end and a second end. The first end of the second portion is orthogonally integral with the second end of the first portion. The second portion has a plurality of apertures formed therethrough downwardly of the second end thereof. The device contains a hollow vertical post having an open first end and a second end. The hollow vertical post has an aperture formed therethrough upwardly of the open first end thereof. The open first end telescopically receives the second end of the second portion of the right angle extension therein with the aperture selectively aligning with one of the plurality of apertures of the second portion for securement thereto by a nut and bolt. The device contains a hollow horizontal post having open end portions. A midpoint of the hollow horizontal post being integral with the second end of the hollow vertical post in an orthogonal relationship. The hollow horizontal post has an aperture formed therethrough inwardly of the open end portions. The device contains a pair of cross bars. Each of the cross bars has a first end and a second end. Each of the cross bars has a plurality of apertures formed therethrough. The first end of the pair of cross bars are telescopically received within the open end portions of the hollow horizontal post with the aperture formed therethrough inwardly thereof selectively aligning with the plurality of apertures of the pair of cross bars for securement thereto by a nut and bolt. The pair of cross bars have an eye bolt secured inwardly of each second end thereof. A foam padding strip is secured to a top portion of the hollow horizontal post.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved receiver hitch boat and canoe rack which has all the advantages of the prior art mountable racks and none of the disadvantages.

3

It is another object of the present invention to provide a new and improved receiver hitch boat and canoe rack which may be easily and efficiently manufactured and marketed.

It is a further object of the present invention to provide a new and improved receiver hitch boat and canoe rack which is of durable and reliable construction.

An even further object of the present invention is to provide a new and improved receiver hitch boat and canoe rack which is susceptible of a low cost of manufacture with regard to both materials and labor, and which accordingly is then susceptible of low prices of sale to the consuming public, thereby making such a receiver hitch boat and canoe rack economically available to the buying public.

Still yet another object of the present invention is to provide a new and improved receiver hitch boat and canoe rack which provides in the apparatuses and methods of the prior art some of the advantages thereof, while simultaneously overcoming some of the disadvantages normally associated therewith.

Even still another object of the present invention is to provide a new and improved receiver hitch boat and canoe rack for supporting a back end of a boat or canoe that extends over a top portion of a vehicle while being transported.

Lastly, it is an object of the present invention to provide a new and improved receiver hitch boat and canoe rack comprised of a right angle extension adapted for adjustable coupling with a receiver hitch on a vehicle. A hollow vertical post telescopically receives the right angle extension for adjustable securement thereto by a nut and bolt. A hollow horizontal post is integral with the hollow vertical post in an orthogonal relationship. The hollow horizontal post has open end portions. A pair of cross bars are telescopically received within the open end portions of the hollow horizontal post for adjustable securement thereto by a nut and bolt. The pair of cross bars have an eye bolt secured thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

4

DESCRIPTION OF THE PREFERRED EMBODIMENT

Figure 1:
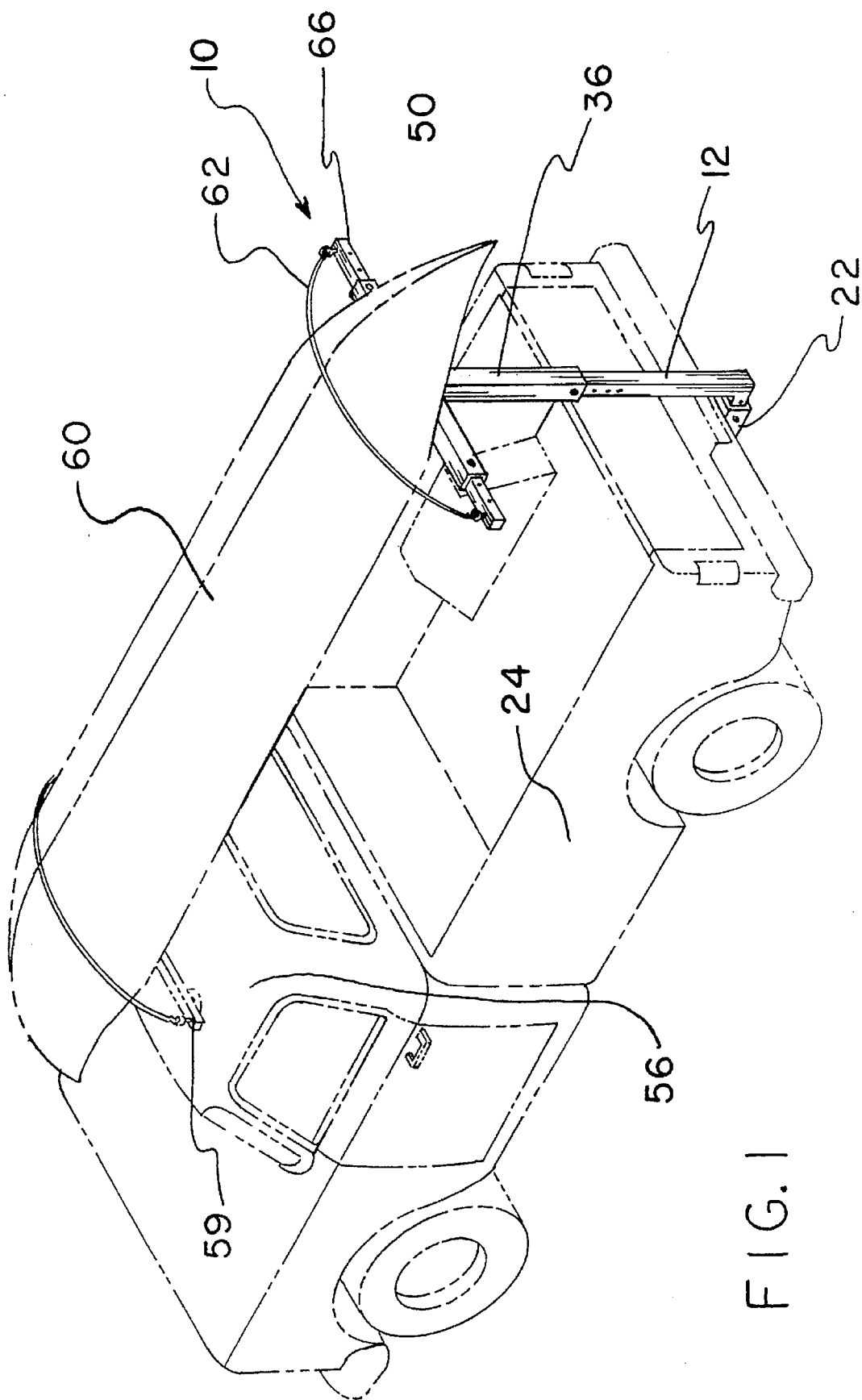
FIG. 1 is a perspective view of the preferred embodiment of the receiver hitch boat and canoe rack constructed in accordance with the principles of the present invention.
Figure 3:
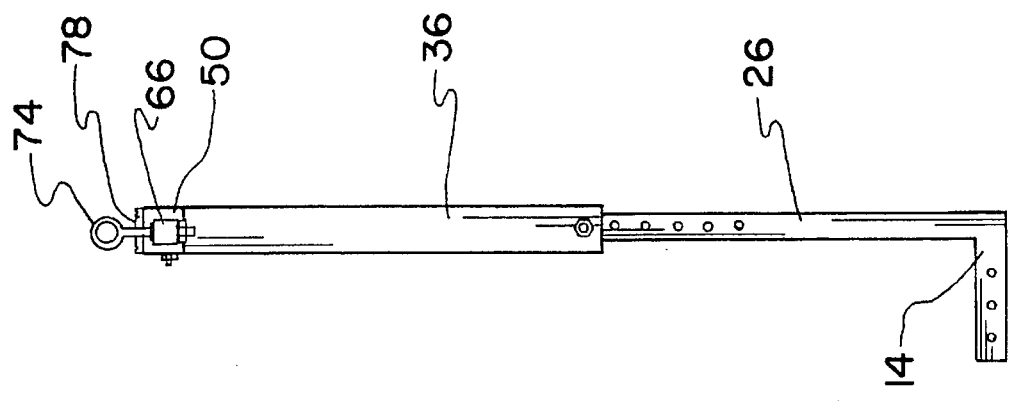
FIG. 3 is a side elevation view of the present invention.
Figure 2:
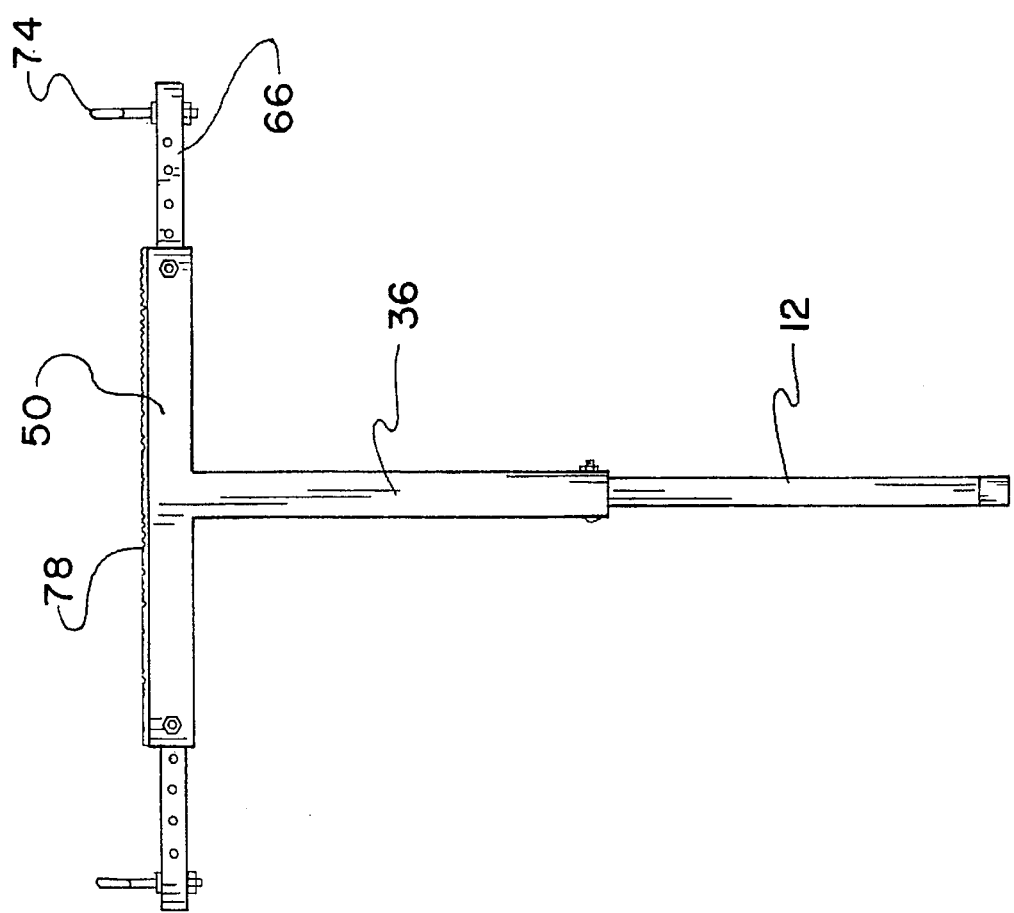
FIG. 2 is a front elevation view of the present invention.
Figure 4:
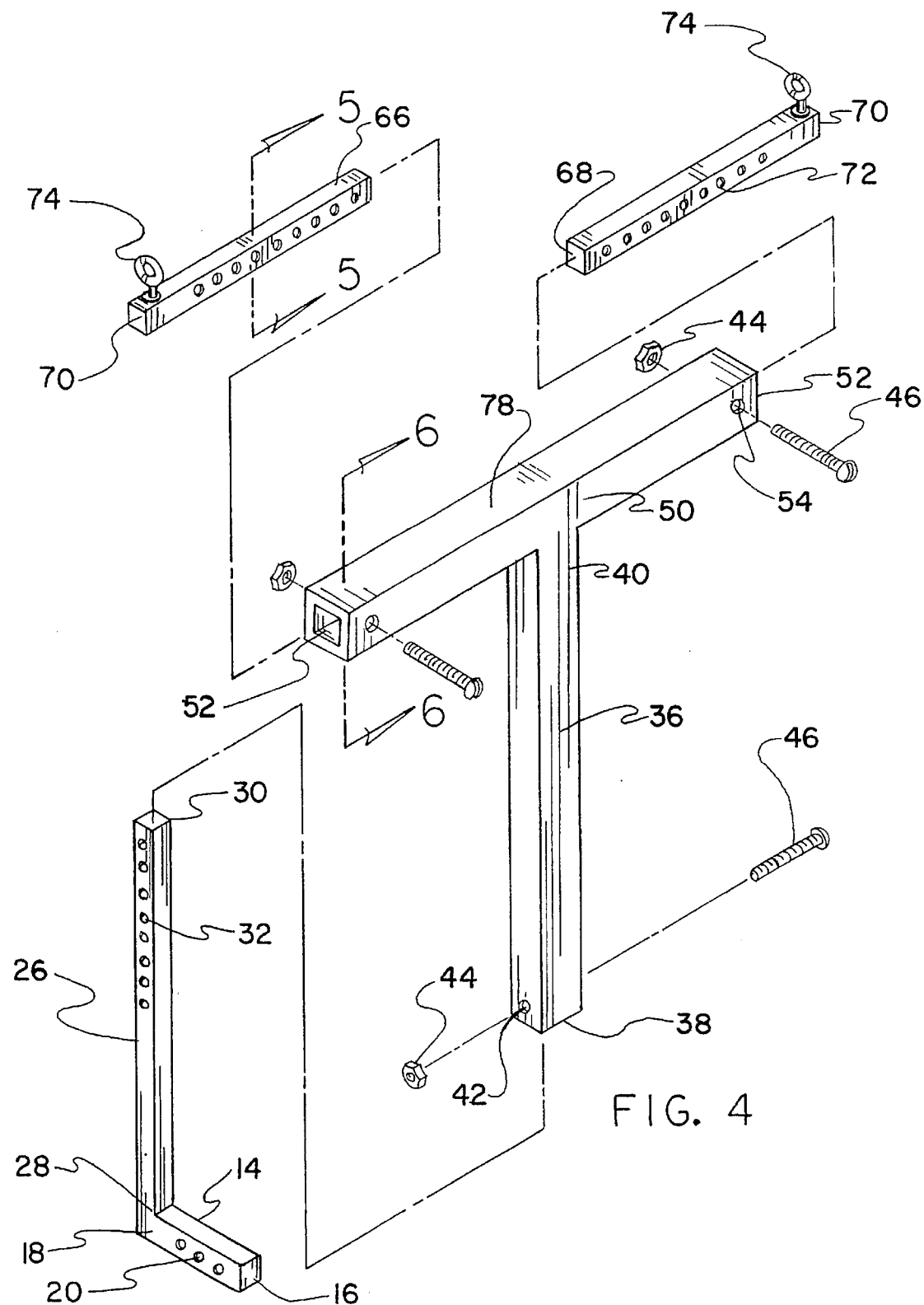
FIG. 4 is an exploded perspective view of the present invention.
Figure 5:
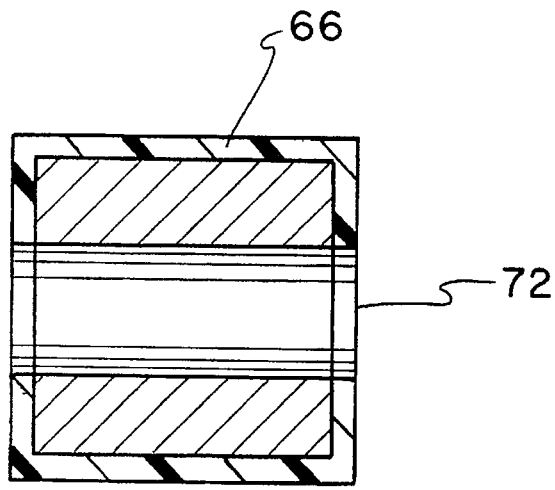
FIG. 5 is a cross-sectional view as taken along line 5—5 of FIG. 4.
Figure 6:
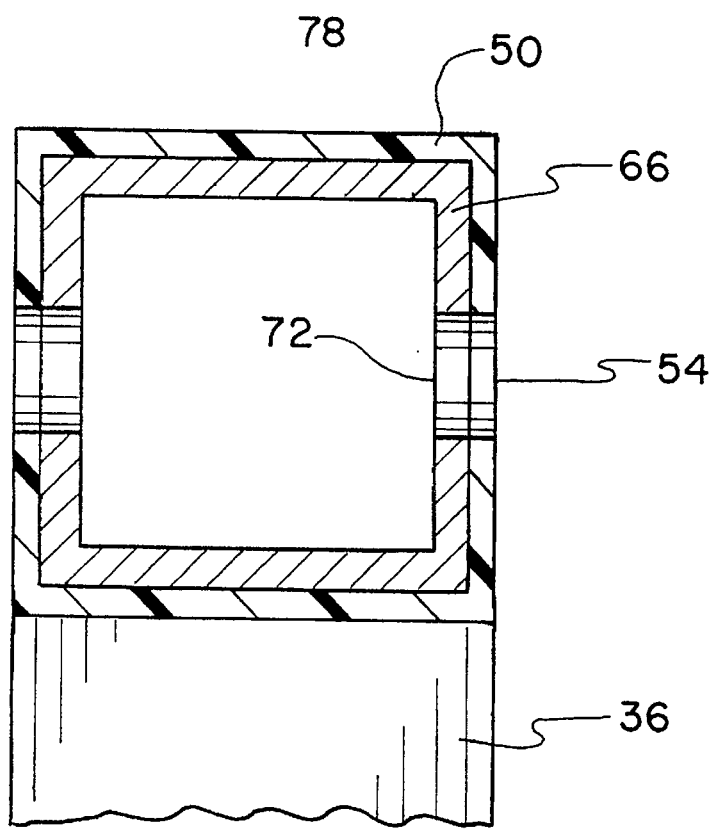
FIG. 6 is a cross-sectional view as taken along line 6—6 of FIG. 4.

With reference now to the drawings, and in particular, to FIG. 1–6 thereof, the preferred embodiment of the new and improved receiver hitch boat and canoe rack embodying the principles and concepts of the present invention and generally designated by the reference number 10 will be described.

Specifically, it will be noted in the various Figures that the device relates to a new and improved receiver hitch boat and canoe rack for supporting a back end of a boat or canoe that extends over a top portion of a vehicle while being transported. In its broadest context, the device consists of a right angle extension, a hollow vertical post, a hollow horizontal post, a pair of cross bars, and a foam padding strip.

The device 10 contains a right angle extension 12 having a first securement portion 14. The first portion 14 has a first end 16 and a second end 18. The first portion 14 has a plurality of apertures 20 formed therethrough inwardly of the first end 16 thereof. The first end 16 is adapted for adjustable coupling with a receiver hitch 22 on a vehicle 24. The plurality of apertures 20 allow for the user to adjust the first portion 14 either inwardly or outwardly depending on the make of the vehicle 24. The right angle extension 12 has a second portion 26. The second portion 26 has a first end 28 and a second end 30. The first end 28 of the second portion 26 is orthogonally integral with the second end 18 of the first portion 14. The second portion 26 has a plurality of apertures 32 formed therethrough downwardly of the second end 30 thereof. The first portion 14 can be adjusted in relation to the receiver hitch 22 to allow the second portion 26 to clear or avoid any obstructions, such as spare tires, on a tailgate of the vehicle 24.

The device 10 contains a hollow vertical post 36 having an open first end 38 and a second end 40. The hollow vertical post 36 has an aperture 42 formed therethrough upwardly of the open first end 38 thereof. The open first end 38 telescopically receives the second end 30 of the second portion 26 of the right angle extension 12 therein with the aperture 42 selectively aligning with one of the plurality of apertures 32 of the second portion 26 for securement thereto by a nut 44 and bolt 46.

The device 10 contains a hollow horizontal post 50 having open end portions 52. A midpoint of the hollow horizontal post 50 being integral with the second end 40 of the hollow vertical post 36 in an orthogonal relationship. The hollow horizontal post 50 has an aperture 54 formed therethrough inwardly of the open end portions 52. By adjusting the hollow vertical post 36 upwardly or downwardly in relationship to the right angle extension 12, the hollow horizontal post 50 can be aligned with a cab 56 of the vehicle 24 to allow a boat or canoe 60 to have one of its ends placed atop the hollow horizontal post 50 and its opposing end to be placed on front supports 59 atop the cab 56 of the vehicle 24. The boat or canoe 60 can then be secured to the front supports 59 by a safety rope or strap 62.

The device 10 contains a pair of cross bars 66. Each of the cross bars 66 has a first end 68 and a second end 70. Each of the cross bars 66 has a plurality of apertures 72 formed therethrough. The first end 68 of the pair of cross bars 66 are telescopically received within the open end portions 52 of the hollow horizontal post 50 with the aperture 54 formed therethrough inwardly thereof selectively aligning with one of the plurality of apertures 72 of the pair of cross bars 66 for securement thereto by a nut 44 and bolt 46. The pair of cross bars 66 have an eye bolt 74 secured inwardly of each second end 70 thereof. The pair of cross bars 66 can be adjusted inwardly or outwardly in relation to the hollow horizontal post 50 to conform to the width of the boat or canoe 60 thereby allowing that end of the boat or canoe 60 to be secured by the safety rope or strap 62 through the eye bolts 74 on each of the pair of cross bars 66.

A foam padding strip 78 is secured to a top portion of the hollow horizontal post 50. The foam padding strip 78 protects the boat or canoe 60 from being scratched up when in place atop the hollow horizontal post 50.

The present invention is a rack which fits into a receiver hitch 22 on a vehicle 24 to support the back end of a canoe 60 that extends over the top when it is being transported.

The steel rack has a right angle extension 12 at the bottom that fits into the receiver hitch 22. Such units often accept two inch square tubing. A hollow vertical post 36 which telescopes together with the right angle extension 12 for length adjustment supports a hollow horizontal post 50 upon which one end of the inverted canoe 60 is placed. Foam covering 78 protects and cushions the canoe 60, and eye bolts 74 are provided for lashing it down. The width of the hollow horizontal post 50 can be adjusted, or provided in different lengths. Substantial bracing is added to ensure that the unit is rigid and very strong. The preferred method of fabrication is welding, which ensures the reliability of the joints and eliminates any play or looseness. One unit can be made to support two canoes 60. Front supports 59 are needed at the cab 56, fastened to prevent shifting. Suitable corrosion protection would be provided on all steel parts.

The receiver hitch 22 can be added to the vehicle 24 in only minutes. After the front support 59 is added, the canoes 60 are placed on the rack and lashed in place; they are now ready for transport. Similarly, only minutes are needed to remove the canoes.

This arrangement does not interfere with the use of the body of the vehicle 24, and nothing is towed behind.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A receiver hitch boat rack for supporting a back end of a boat that extends over a top portion of a vehicle while being transported comprising, in combination:

a right angle extension having a first securement portion, the first portion having a first end and a second end, the first portion having a plurality of apertures formed therethrough inwardly of the first end thereof, the first end being adapted for adjustable coupling with a receiver hitch on a vehicle, the right angle extension having a second portion, the second portion having a first end and a second end, the first end of the second portion orthogonally integral with the second end of the first portion, the second portion having a plurality of apertures formed therethrough downwardly of the second end thereof;

a hollow vertical post having an open first end and an open second end, the hollow vertical post having an aperture formed therethrough upwardly of the open first end thereof, the open first end telescopically receiving the second end of the second portion of the right angle extension therein with the aperture selectively aligning with one of the plurality of apertures of the second portion for securement thereto by a nut and bolt;

a hollow horizontal post having open end portions, a midpoint of the hollow horizontal post being integral with the second end of the hollow vertical post in an orthogonal relationship, the hollow horizontal post having an aperture formed therethrough inwardly of each of the open end portions;

a pair of cross bars, each of the cross bars having a first end and a second end, each of the cross bars having a plurality of apertures formed therethrough, the first end of each of the cross bars being telescopically received within the open end portions of the hollow horizontal post with the aperture formed therethrough inwardly thereof selectively aligning with the plurality of apertures of the pair of cross bars for securement thereto by a nut and bolt, respectively, the pair of cross bars each having an eye bolt secured inwardly of each second end thereof;

a foam padding strip secured to a top portion of the hollow horizontal post wherein the rack is solely supported by the receiver hitch when the first end of the first portion is coupled therewith and a boat is supported on the rack.

* * * * *